J. D. LATHROP,

Assignor, by mesne assignments, to himself and A. P. SUTPHEN.

Milk-Pail.

No. 8,532. Reissued Jan. 7, 1879.

Witnesses
John Becker
Fred. Haynes

Inventor
John D. Lathrop
by his Attorneys
Brown & Brown

N. PETERS, PHOTO-LITHOGRAPHER, WASHINGTON, D. C.

UNITED STATES PATENT OFFICE.

JOHN D. LATHROP, OF SOMERVILLE, N. J., ASSIGNOR, BY MESNE ASSIGNMENTS, TO HIMSELF AND ARTHUR P. SUTPHEN, OF SAME PLACE.

IMPROVEMENT IN MILK-PAILS.

Specification forming part of Letters Patent No. 195,138, dated September 11, 1877; Reissue No. 8,532, dated January 7, 1879; application filed November 13, 1878.

DIVISION A.

*To all whom it may concern:*

Be it known that I, JOHN D. LATHROP, of Somerville, in the county of Somerset and State of New Jersey, have invented certain new and useful Improvements in Combined Milking Pail and Stool, which improvements are fully set forth in the following specification, reference being had to the accompanying drawings.

My invention relates to a milking-pail so constructed and arranged as to serve the double purpose of a receptacle for the milk and of a stool or seat for the accommodation of the person employed in the operation of milking.

The invention consists in a milking-pail which has combined with it a separate receiver, connected with said pail by a flexible and elastic tube, and has furthermore combined with it an adjustable support for sustaining said receiver.

The invention furthermore consists in a support for said receiver of special construction, in combination with said receiver and a flexible and elastic tube connecting the receiver with the pail; likewise in a combination, with a spout on the pail, and with a flexible and elastic tube connecting the pail with the receiver, of a strainer applied to the inner end of said tube, and removable with it through the spout of the pail, also detachable from said tube, when required.

Figure 1:
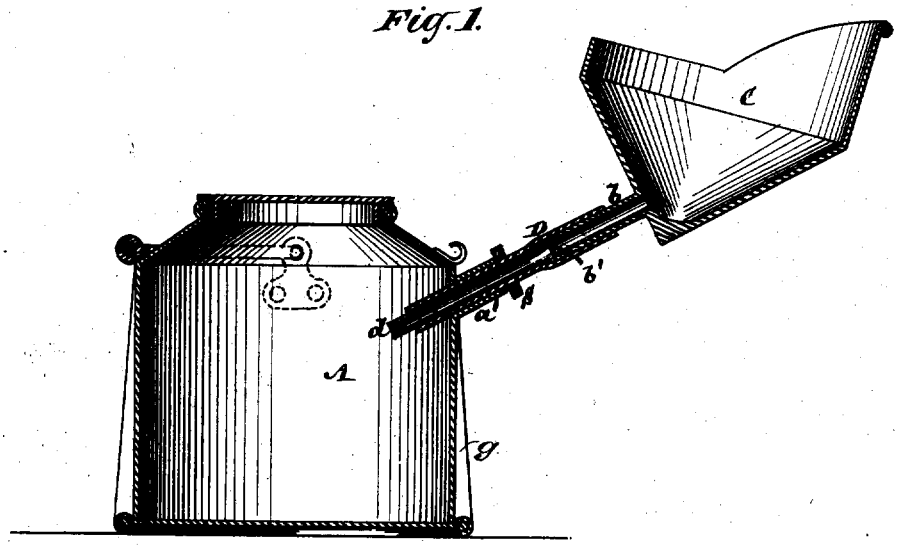
Figure 2:
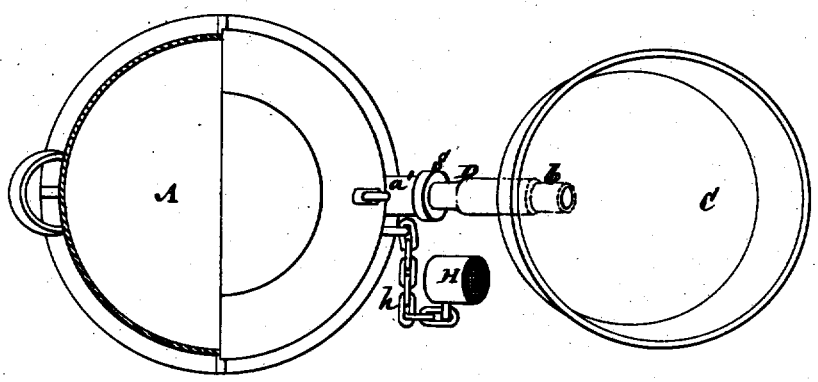

In the accompanying drawings, Figure 1 is a vertical transverse section of my combined milking pail and stool having the invention applied; and Fig. 2, a plan view of the same, one-half the pail being represented in section.

The pail A may be constructed of tin-plate or other suitable material.

The milk-receiver C in its general form may resemble a funnel placed in an inclined position, the lower side thereof being extended considerably beyond the upper side, so as to form a projecting lip. Said receiver C is capable of being adjusted by simply turning it about the axis of its spout *b*, so that a stream of milk from the cow may be directed into its open end either vertically, horizontally, or at any intermediate angle, without deflecting or spattering, in such a direction that any portion thereof will fall outside the receiver, while at the same time the milk will flow freely down the inclined tube *b* into the tube D, and thence into the pail A as fast as it enters the receiver.

In order that the apparatus may be used conveniently with cows of different sizes or heights, it is essential that the milk-receiver should be capable of being adjusted and secured at any required height above the pail, while at the same time it must be connected with the pail in such a manner that it will not be liable to injury or disarrangement from the kicks of vicious or unruly animals.

In order to provide for this adjustment, the receiver is connected with the pail by means of a universally-flexible tube movable in all directions, and is supported by means of a device which admits of convenient and ready adjustment. These features of my invention I will now describe.

The inclined conductor or spout *b*, which is attached to the receiver C, is inserted within the upper end of a flexible elastic tube, D, preferably of india-rubber or other equivalent material, which is retained in its position by its own elasticity. The lower end of the tube D is introduced into the pail A through an inclined spout or inlet-tube, *a'*, which projects angularly upward from the side of the pail. The flexible tube D is of such diameter as to admit of its being slid freely in and out within the inclined tube or spout *a'*, so as to provide for the height of the receiver being varied at pleasure.

A metal thimble provided with or forming a strainer, *d*, is inserted into the inner end or outlet of the tube D, and is firmly held in its position by the elasticity of the said tube.

Another similar strainer, *b'*, may be attached to the end of the spout or conductor *b* at the inlet of the tube D, and thus the milk is strained as it passes from the receiver to the pail A, thereby more effectually separating from it any particles of foreign matter that may have accidentally found their way into the receiver. The upper strainer, *b'*, may be dispensed with in cases where a single strainer is found to be sufficient.

The arrangement of the strainer *d* within the inner or outlet end of the tube D provides for its ready removal with the latter through the spout *a'*, which could not be done if the strainer were put on the outside of the said tube. It also provides for its detachment from the tube, when necessary, for the purposes of cleaning, repair, or renewal.

The receiver C is sustained by an adjustable support to raise or lower the receiver, and to hold it at any required elevation, as well as to admit of its free motion in any direction, so that in case it is struck or kicked by an unruly cow it will yield to the blow without sustaining any injury, and immediately return to its normal position.

A cheap and efficient means for this purpose consists of a ring or collar, S, fitted so as to be capable of adjustment along the exterior of the flexible tube D, and of such size as to clasp said tube rather tightly, and so be held at any desired position by the elasticity of the tube on the latter, while, if necessary, the spout *b* of the receiver may be lengthened also, or projected more or less within the tube D. The latter may be adjusted in respect to its height by the set of the ring or collar S along the flexible tube D, and sliding of the latter within the spout *a'*, said collar, when adjusted, resting on or against said spout.

By varying the distance of the outlet or lower end of the inclined tube or spout *b* of the receiver from the collar S, the latter bearing against the end of the spout *a'*, the height at which the receiver is supported may be readily regulated.

I have provided a separate strainer, H, made to fit the spout or nozzle *a'*, and attached to the pail A by a short chain, *h*, which may be placed upon the said spout after the receiver C and its attachments have been removed, and before pouring the milk from the pail A into another vessel, whereby the milk is strained a second or third time before being used, which will, in many cases, be found advantageous.

It will be observed that all the parts of the apparatus are so constructed as to be easily separable from each other for the purpose of washing or cleansing.

It will also be seen that when the receiver and its attachments are removed, the pail A, owing to its peculiar form, may be conveniently used as a batter-pail or water-pail, or, by attaching a rose, as a sprinkling-pail.

I claim as my invention—

1. The combination of a milking-pail, a receiver for supplying the latter, a flexible and elastic tube connecting said receiver with the pail, and an adjustable support for sustaining said receiver, substantially as specified.

2. The combination, with a milking-pail having an upwardly-projecting spout, a receiver having a flexible and elastic tube fitting loosely in said spout, and a close-fitting collar applied to the exterior of said flexible and elastic tube, adapted to lie against the end of the said pail-spout, for supporting said tube at any point to which it may be inserted therein, substantially as and for the purpose set forth.

3. The combination, with the spout *a'* of the pail, the receiver, and the flexible and elastic tube D, connecting said receiver with the pail, of a strainer or straining-thimble, *d*, fitting within the inner or outlet end of said tube, and removable, along with the latter, through the spout of the pail, substantially as and for the purposes described.

JOHN D. LATHROP.

Witnesses:
HENRY T. BROWN,
OWEN PRENTISS.